(12) United States Patent
Koenig et al.

(10) Patent No.: US 6,358,291 B1
(45) Date of Patent: Mar. 19, 2002

(54) TRAILER AIR DRYER WITH BYPASS VALVING AND SERVICE INDICATOR

(76) Inventors: James P. Koenig, 26915 Elizabeth La., Olmsted Twp., OH (US) 44138; Leonard Quinn, 352 Carol La., Elyria, OH (US) 44035; Richard J. Conklin, 29101 Foote Rd., Bay Village, OH (US) 44140; Fred Hoffman, 24540 Emmons Rd., Columbia Station, OH (US) 44028

( * ) Notice: Subject to any disclaimer, the term of this patent is extended or adjusted under 35 U.S.C. 154(b) by 0 days.

(21) Appl. No.: 09/399,285

(22) Filed: Sep. 17, 1999

(51) Int. Cl.[7] .................. B01D 46/42; B01D 46/44; B01D 46/46
(52) U.S. Cl. .............. 55/312; 55/309; 96/188
(58) Field of Search .......... 55/309, 311, 312, 55/DIG. 17; 96/188, 189

(56) References Cited

U.S. PATENT DOCUMENTS

| | | | | |
|---|---|---|---|---|
| 2,962,119 A | * | 11/1960 | White | 55/309 |
| 3,323,292 A | * | 6/1967 | Brown | 96/110 |
| 3,572,008 A | * | 3/1971 | Hankison | 55/33 |
| 3,941,958 A | * | 3/1976 | Flesburg | 200/82 R |
| 4,113,451 A | * | 9/1978 | Frantz | 96/112 |
| 4,366,837 A | * | 1/1983 | Roettgen | 137/557 |
| 4,468,239 A | * | 8/1984 | Frantz | 96/114 |
| 4,713,094 A | * | 12/1987 | Yanagawa et al. | 96/147 |
| 5,286,283 A | * | 2/1994 | Goodell | 96/113 |
| 5,678,900 A | * | 10/1997 | Blanz | 303/6.01 |
| 5,851,269 A | * | 12/1998 | Strope | 96/144 |
| 5,947,239 A | * | 9/1999 | Koelzer | 188/352 |
| 5,961,698 A | * | 10/1999 | Dossaji et al. | 96/130 |
| 6,071,321 A | * | 6/2000 | Trapp et al. | 55/318 |
| 6,076,272 A | * | 6/2000 | Conklin | 34/80 |
| 6,126,724 A | * | 10/2000 | Martin | 96/4 |

* cited by examiner

Primary Examiner—J. J. Swann
Assistant Examiner—David A. Divine

(57) ABSTRACT

A trailer air dryer is provided to minimize contamination, leakage or freeze-up of the valves used in a pneumatic braking and suspension system caused by moisture or foreign particles in the system. A bypass assembly is provided to ensure normal brake operation should the filters or drying material/desiccant become plugged. In one embodiment, an audible signal or warning is provided to the operator indicating need for servicing the trailer air dryer.

20 Claims, 7 Drawing Sheets

TRAILER AIR DRYER WITH BYPASS VALVING AND SERVICE INDICATOR

BACKGROUND OF THE INVENTION

1. Field of the Invention

This invention relates to an air dryer system for use in a compressed air system. More particularly, the invention relates to an air dryer system for use in a trailer where protection that is normally provided for the tractor may not be available.

2. Discussion of the Art

Compressed air systems are widely used to operate a number of devices, and find particular use in braking systems for heavy vehicles. These systems include an air compressor which compresses ambient air and charges a storage reservoir. The compressor is engine operated and a governor, responsive to the reservoir pressure, selectively enables or disables the compressor as needed. Air dryers commonly employ a drying material or desiccant through which air passes to remove entrained moisture and limit problems associated with moisture associated with brake system components. Moisture is adsorbed by the desiccant and removed from the compressed air before it is communicated to the storage reservoir. In these known systems, periodic or cyclic purging of the air dryers is required in order to purge or regenerate the desiccant.

No provision has been made for trailer air dryers to separately protect devices that may not be protected by the tractor's air dryer. As will be appreciated, contamination, foreign particles, leakage, and freeze-up of the pneumatic valves used in trailer braking and trailer suspension systems can be associated with the lack of an effective trailer dryer system. Therefore, there is a perceived need for a trailer air dryer that simultaneously filters and dries wet air sent to the trailer. The active drying material can act as a moisture buffer, adsorbing moisture from the air during wet air consumption, and releasing previously captured moisture in vapor phase when the incoming air is dry, thereby regenerating the desiccant in a non-cyclic fashion.

SUMMARY OF THE INVENTION

The present invention solves the noted problems and others and provides an air dryer useful in a trailer braking and suspension system.

According to the invention, an air dryer for a trailer braking assembly includes a housing having first and second passages extending therethrough. Each passage has a drying material disposed therein for removing moisture directed through the passage. A third passage provides a bypass if a predetermined differential pressure threshold is exceeded.

According to another aspect of the invention, the first and second passages are different sizes to accommodate the supply and control air, and bypasses are provided for each passage if a predetermined differential pressure threshold is exceeded.

According to another aspect of the invention, a filter is associated with the drying material in each passage to clean the air passing therethrough.

According to a still further aspect of the invention, a signal generator is associated with the housing to provide a signal to the operator that the differential pressure threshold has been exceeded.

A primary benefit of the present invention is the ability to protect devices that may or may not be protected by the tractor.

Still another benefit resides in the ease with which the air dryer assembly can be incorporated into the trailer braking system.

Yet another benefit of the invention is realized by the ability to effectively remove the air dryer from the trailer braking system if it becomes plugged or blocked.

Still other advantages and benefits of the invention will become apparent to those skilled in the art upon a reading and understanding of the following detailed description.

DETAILED DESCRIPTION OF THE PREFERRED EMBODIMENTS

Figure 1:
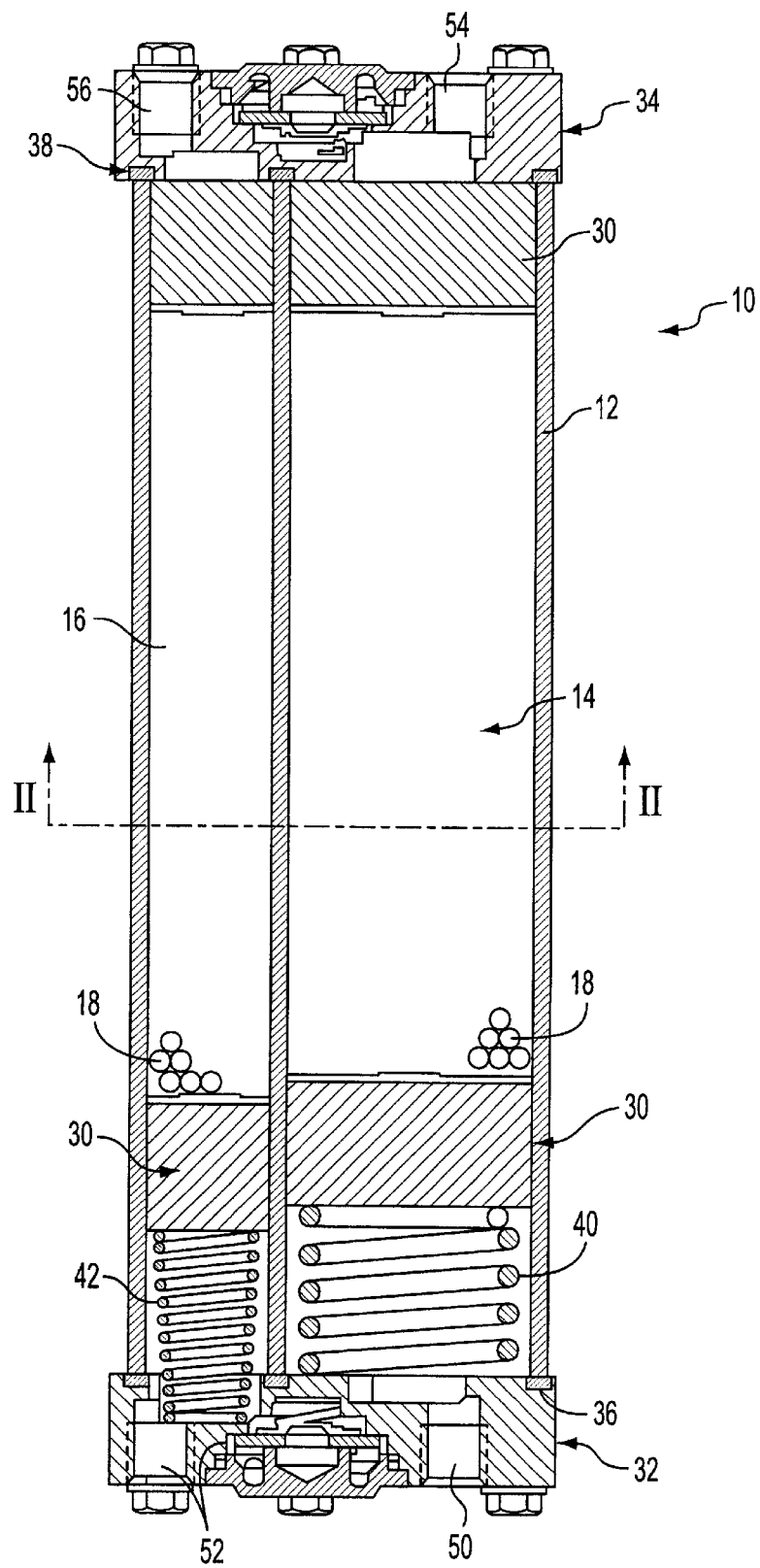
FIG. 1 is a longitudinal, cross-sectional view of a preferred form of trailer air dryer assembly.
Figure 2:
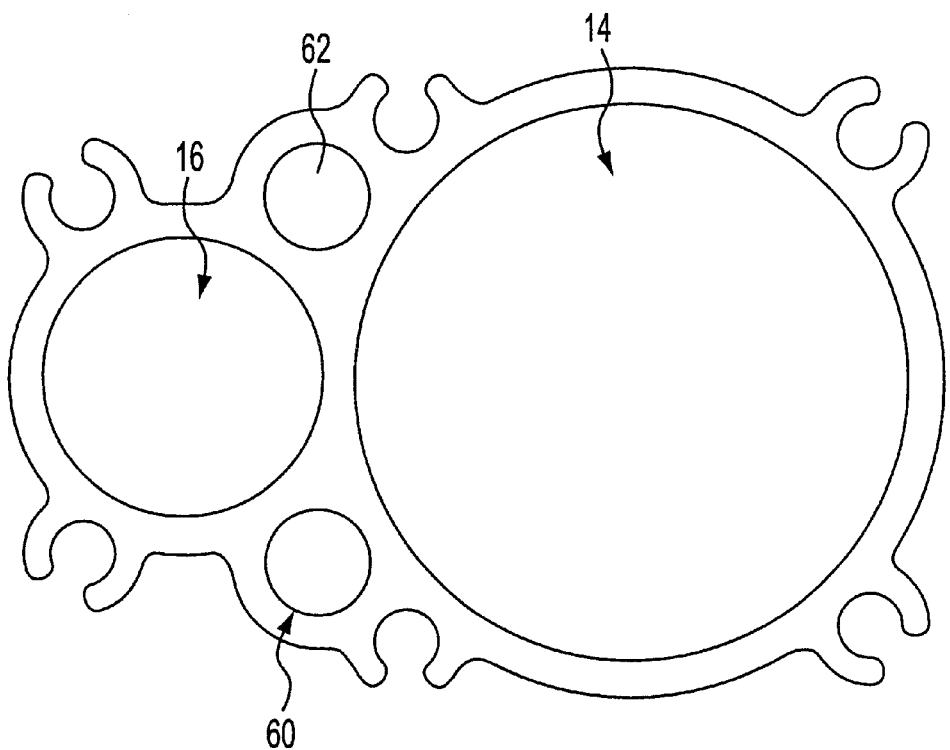
FIG. 2 is a cross-sectional view taken generally along the lines 2—2 of FIG. 1.

FIGS. 1 and 2 are cross-sectional views of a first preferred embodiment of the trailer air dryer 10. The air dryer includes a housing 12 which is preferably an aluminum extrusion that is simple and cost effective to manufacture. Of course, alternative constructions are also contemplated without departing from the scope and intent of the present invention. The housing includes a series of generally parallel passages extending therethrough. A first passage or supply passage 14 has the largest cross-sectional dimension of all the passages and is adapted to provide supply air used for trailer braking. A second, or control line, passage 16 is of slightly smaller cross-sectional dimension and is intended to carry a control signal or pneumatic pressure signal to actuate the valve in response to operator demand. The supply and control line passages each include a drying material such as a desiccant material 18 or other drying agent. The drying material fills the entire cross-section of the passage and extends for a majority of the longitudinal extent of each of the passages. The drying material is preferably contained at opposite ends by filter members 30. For example, a preferred filter member is a perforated cloth and filter media that removes particles from the air flow through the supply and control line passages. The drying materials and filter members are axially held in place in the passages by end covers 32, 34, details of which will be described further below. End cover seals 36, 38 are interposed between the housing and end covers to provide a sealed arrangement. As will be appreciated, any conventional type of seal assembly can be used.

In addition, a biasing assembly is provided to maintain a desired preload and compaction of the drying material. In the preferred arrangement, the biasing assembly is defined by a pair of springs 40, 42 received at one end of the passages 14, 16, respectively. The springs are illustrated as coil springs that engage the end cover 32 at one end and the associated filter member at the other end. The springs impose a slight compressive force or compaction on the drying material so that it operates in its intended manner.

Each end cover includes passages that communicate with the supply line and the control line (not shown), respectively. For purposes of identification, these passages are identified as 50, 52 in the supply side of the end cover and 54, 56 in the delivery side end cover. During normal operation of the trailer air dryer, air flow proceeds into the opening 50, through the filters and drying material in passage 14, and exits via the passage 54 in the second end cover. Likewise, the pneumatic control signal is sent through opening 52, through the filter members and drying material of passage 16, and outlets through opening 56 in the second end cover.

Since the trailer air dryer assembly is inserted in the lines or hoses that communicate with the brakes of the trailer, any failure mode could potentially result in a no brake situation. Therefore, it is important to have a bypass arrangement that assures normal operation of the braking and would temporarily remove the dryer assembly from the trailer braking assembly if a failure mode is encountered. For example, if the filters or desiccant material becomes plugged, it is desirable to have a relief or bypass arrangement that operates at a low pressure differential (i.e, a few psi pressure differential) to open. FIG. 2 illustrates bypass passages 60, 62 that are parallel to the passages 14, 16 through the housing. In the preferred arrangement, one of the bypass passages is controlled by a supply side bypass valve located in one of the end covers here, the first or supply side end cover 32. Each of the bypass valves is of similar construction and each allows flow in either direction in response to a pressure differential. Accordingly, if pneumatic flow through the supply passage 14 is blocked or plugged, the supply bypass valve in the end cover 32 opens and allows air from the inlet 50 to reach the bypass passage 62. Air then proceeds through the bypass passage to the second end cover 34 and ultimately supplies air to the trailer braking system. Likewise, if flow through the control passage 16 is blocked, the relief valve in the end cover 32 opens, thereby allowing air from inlet 52 to communicate through bypass passage 60 with the outlet 56. As mentioned above, if either the supply or control passage is blocked, the relief valves are designed to allow flow in the opposite direction through the bypass passages also. Thus, a small pressure differential, on the order of a few psi, is sufficient to open either of the bypass valves.

Figure 3A:
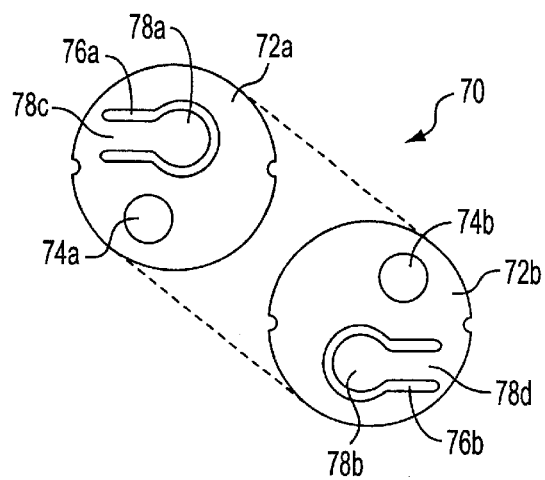
FIGS. 3A and 3B are enlarged views of a preferred bypass valve assembly.
Figure 3B:
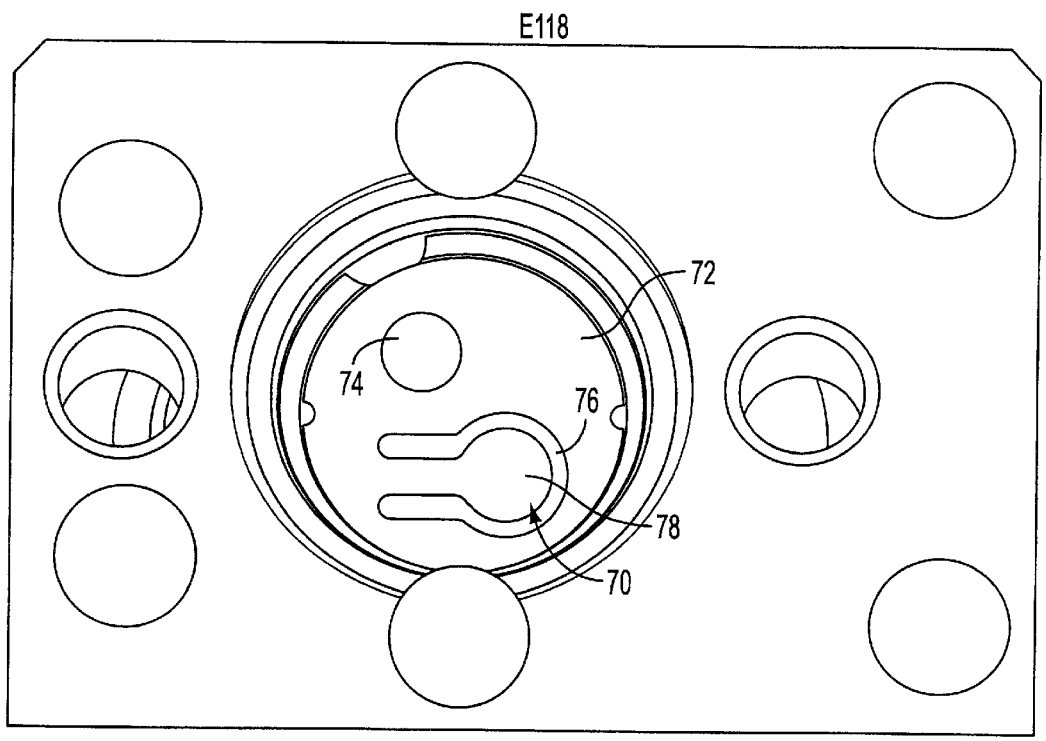

Turning now to FIGS. 3A and 3B, a preferred form of bypass valve is shown as a reed valve 70. A pair of plates or disks 72a, 72b are of identical construction and secured together, such as by spot welding the metal disks together. An opening 74a, 74b and key-holed shaped slot 76a, 76b are provided in each disk. The slot forms a reed valve member 78a, 78b, that is integrally connected with the remainder of the disk via a narrow dimension, flexible arm 78c, 78d. The valve member 78 is larger than the opening so that when the disks are secured in facing, mating relation, the valve member of one disk overlies the opening in the other disk. A keyed arrangement, such as notches in the periphery of the disk, may be provided to properly orient the disks relative to one another and also orient the assembly in the end cover. Moreover, the forming operation of the valve member imposes a preload so that the valve member seats or seals about the periphery of the opening and the arm flexes the valve member to an open position in response to a small pressure differential on the order of a few psi. Thus, flow in either direction is provided through the valve assembly.

Figure 4:
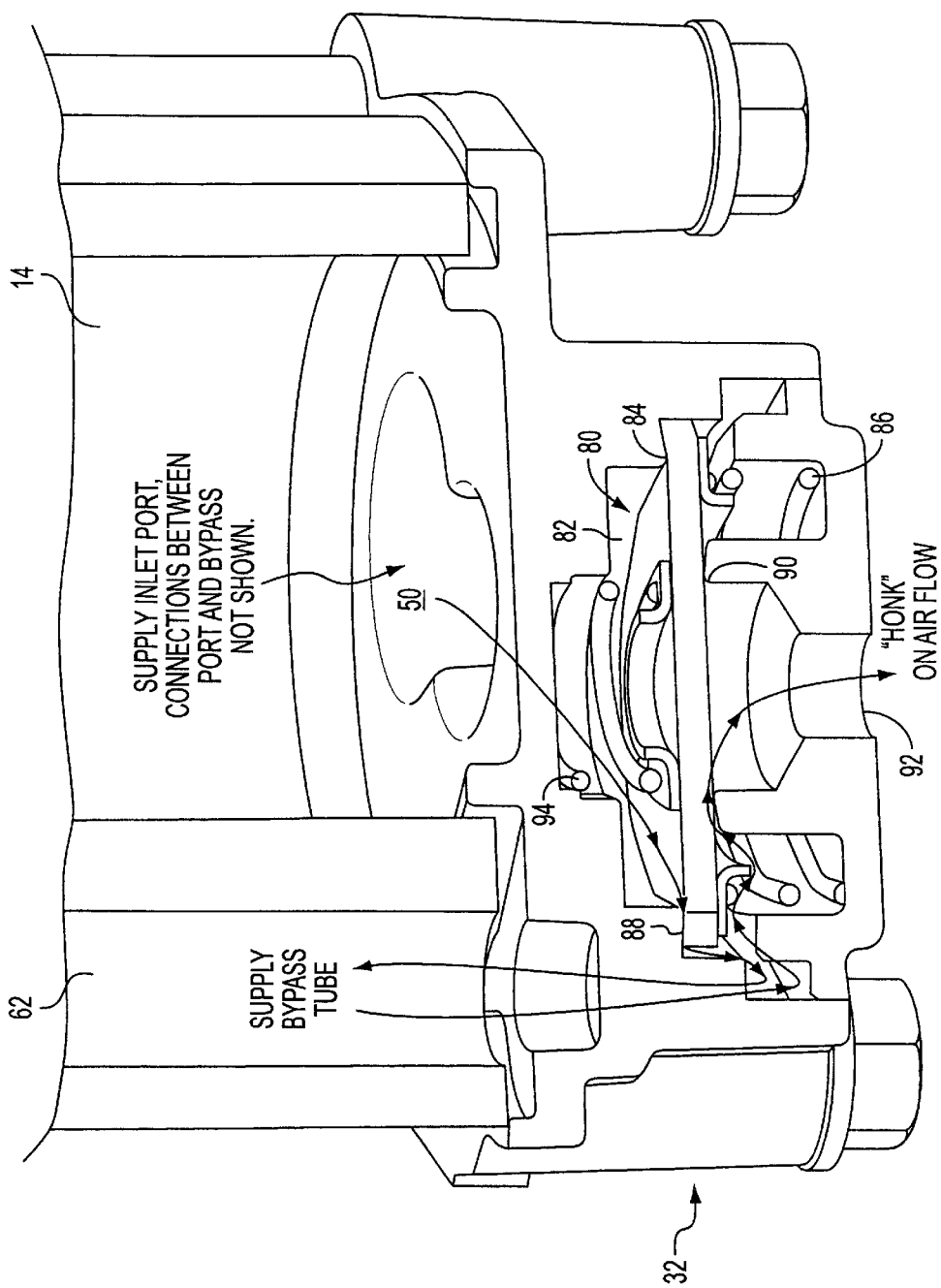
FIG. 4 is an enlarged cross-sectional view of a delivery side end cover.
Figure 5:
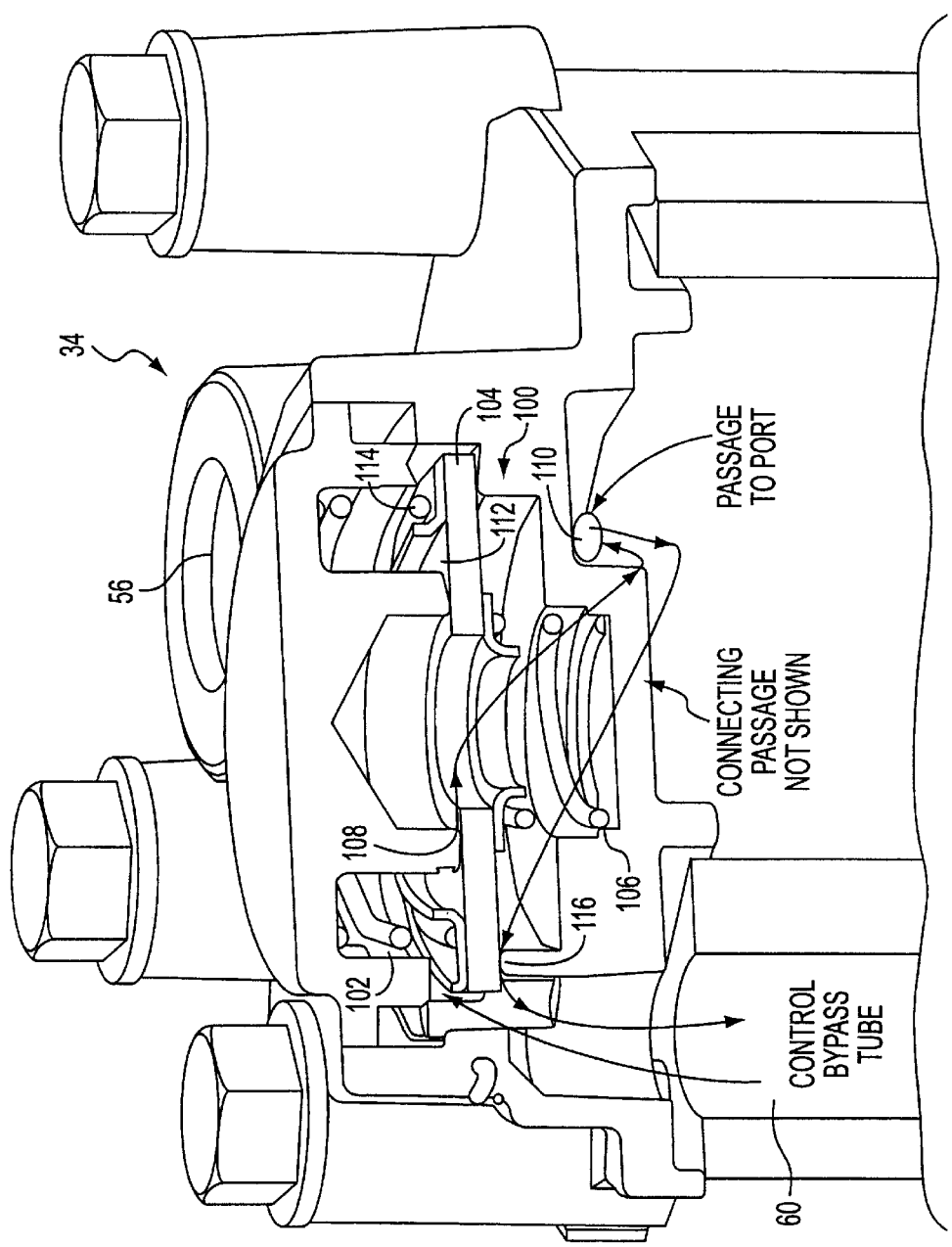
FIG. 5 is an enlarged cross-sectional view of a supply side end cover.

FIGS. 4 and 5 illustrate a second preferred embodiment. Where convenient, like numerals will be used to identify like components and new components are identified by new numerals. For example, in FIG. 4, if air from the supply inlet port 50 cannot pass through passage 14, the pressure differential opens a diaphragm bypass valve represented by numeral 80. This establishes communication with cavity 82 on the first or upper side of diaphragm 84. A biasing force is imposed by spring 86 urging the diaphragm toward a seated condition. When the supply passage 14 is blocked, the biasing force of the spring is overcome and air flow proceeds past valve seat 88 for communication with the supply bypass tube 62. Similarly, air returning through the supply bypass tube will act on a second face, or underside, of the diaphragm 84 to lift it from associated seat 90 and allow air to exit via passage 92. To lift the diaphragm from the seat 90 requires the biasing or closing force of spring 94 to be overcome.

The supply bypass valve 80 has the added feature of providing an audible signal to the operator indicating use of the bypass passage. That is, the diaphragm valve assembly is configured so that air flow past the diaphragm 84 and seat 90 to the outlet 92 provides an audible "honk". This alerts the operator that the bypass passage is in use and of the need for service since communication through the desiccant bed of supply passage 14 is not functional.

FIG. 5 illustrates a similar valve structure in the delivery side end cover. In the preferred embodiment, the delivery side end cover 34 houses the control bypass valve 100. It, too, is a diaphragm valve as shown in this particular illustration. Particularly, air from the control bypass tube 60 communicates with cavity 102 disposed on a first or upper side of the diaphragm member 104. The diaphragm is normally urged by spring 106 into engagement with the valve seat 108. Accordingly, a sufficient buildup of pressure on the upper face of the diaphragm will overcome the force of the spring and allow communication between the control bypass passage and the control port through a passage 110. Similarly, reverse flow through the control port 56 also acts on the second or underside 112 of the diaphragm, thus overcoming the closing force imposed by spring 114 urging the diaphragm against the seat 116.

Figure 6:
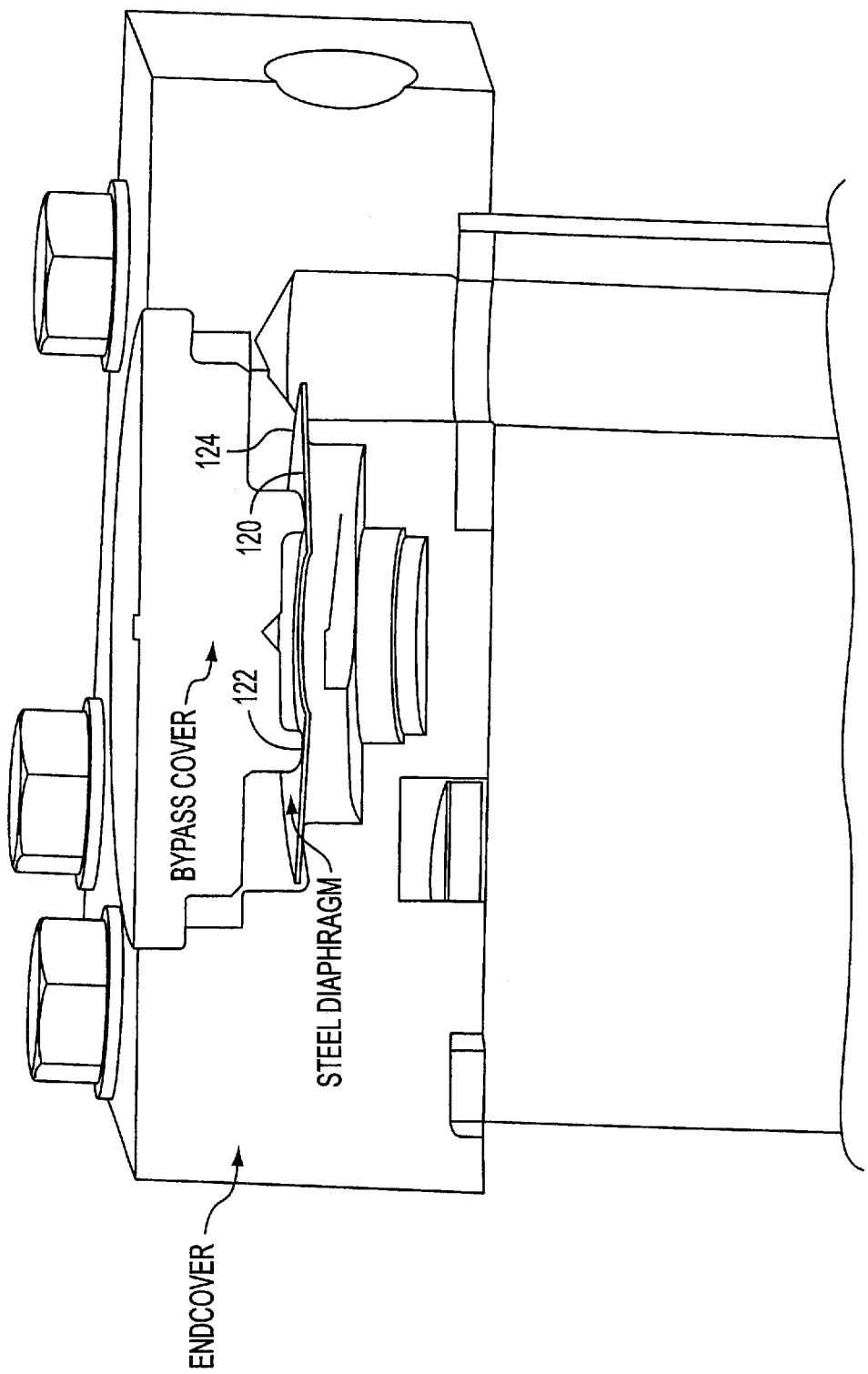
FIG. 6 is a cross-sectional view of an alternative valve bypass valve structure.

FIG. 6 illustrates yet another preferred form of bypass valve assembly. It discloses a single, annular steel diaphragm that has a predetermined bow or contour seating against a radially inner seat 122 and a radially outer seat 124. In much the same manner as described above, this diaphragm arrangement, without the need for additional springs to preload or bias the diaphragm in opposite directions, is responsive to a small psi differential pressure to open in either direction.

It will be appreciated that the embodiments of FIGS. 3 and 6 are simpler from a manufacture and assembly standpoint. On the other hand, the embodiment of FIGS. 4 and 5 includes the ability to provide an audible signal to the operator indicating a blocked supply or control passage. It will also be recognized with regard to the embodiment of FIGS. 4 and 5 that only one of the bypass valve assemblies incorporates the audible signal feature. That is, the air flow through the delivery side end cover is used for applying the brakes so that the valve will not provide an audible signal resulting from flow in that direction. It is only during reverse flow, i.e., the release direction, that the audible signal is available.

Figure 7:
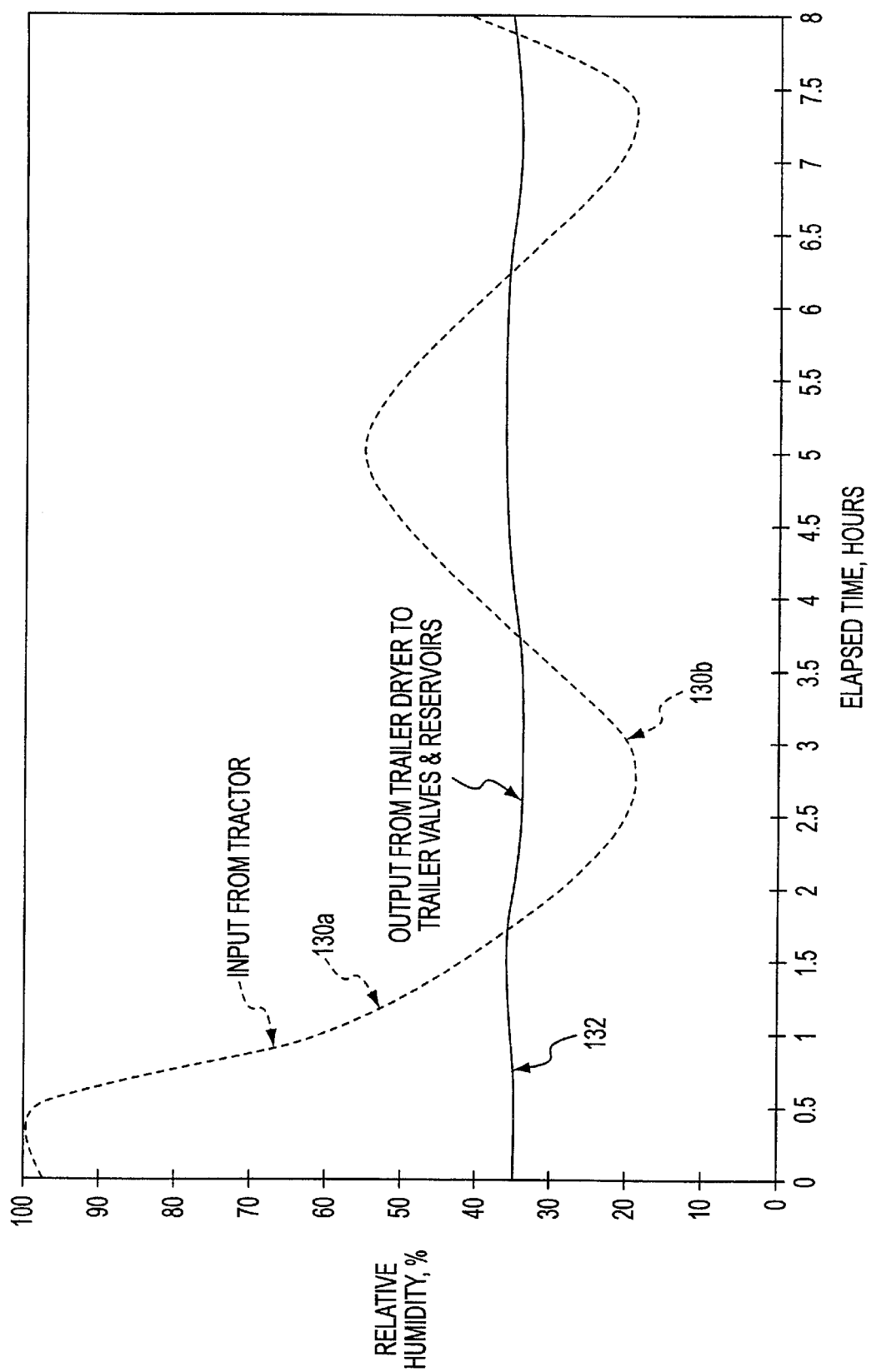
FIG. 7 is a graphical representation comparing time relative to humidity in accordance with the teachings of the present invention.

FIG. 7 provides a graphical representation of the operation of the air dryer as a moisture buffer. As humidity changes over time, and the air proceeds through the air dryer, there are occasions as represented by curve portion 130 where moisture in the input air 130 is removed as represented by the output 132. At other times during operation, the moisture content in the air is below the predetermined output as represented by curve portion 130b. Thus, some of the moisture entrained in the drying material is released to the dry air and removed from the assembly. In this manner, the moisture level can be controlled downstream of the trailer air dryer so that operation of the valves or other components of the truck braking system are not adversely effected. By moderating the amount of moisture that the actuating components encounter, damage is minimized that would otherwise lead to potential freeze-up or other general moisture problems.

In addition, this assembly is intended for one-time use, i.e., it is not designed to be a service device or one in which spare parts are sold. Remanufacture is contemplated upon return of the device to the OEM. It is for these additional reasons that a simple, inexpensive air dryer arrangement is desired that can be easily inserted and removed into a trailer braking system.

The invention has been described with reference to the preferred embodiments. Obviously, modifications and alterations will occur to others upon a reading and understanding of the detailed description. The invention is intended to include such modifications and alterations in so far as they come within the scope of the appended claims and equivalents thereof.

Having thus described the invention, we claim:

1. An air dryer for a trailer braking assembly comprising:
   a housing having first and second passages extending therethrough for receiving air from a supply end and providing air to a delivery end, each passage having an inlet for receiving air from a source external to said air dryer, an outlet for discharging air from said air dryer, and a drying material disposed in each of said first and second passages between the inlet and the outlet for removing moisture from the air;
   a third passage for bypassing air around the first passage if a predetermined differential pressure threshold through the first passage is exceeded.

2. The air dryer of claim 1 wherein the first passage has a larger cross-section than the second passage and carries supply air for the trailer braking assembly.

3. The air dryer of claim 2 wherein the second passage carries control air for the trailer braking assembly.

4. The air dryer of claim 1 further comprising a fourth passage for bypassing air around the second passage if a predetermined differential pressure threshold through the second passage is exceeded.

5. The air dryer of claim 1 wherein the housing includes the first and second passages, and also includes third and fourth passages integrally formed in the housing.

6. The air dryer of claim 1 further comprising a fourth passage that serves as a bypass path for the second passage if a predetermined differential pressure threshold through the second passage is exceeded.

7. The air dryer of claim 6 wherein the fourth passage includes a valve responsive to the differential pressure in the second passage to regulate air through the fourth passage.

8. The air dryer of claim 7 wherein the third passage includes a valve responsive to the differential pressure through the first passage to regulate air through the third passage.

9. The air dryer of claim 1 further comprising a filter material provided in the first and second passages to clean the air passing therethrough.

10. The air dryer of claim 1 further comprising a biasing member for compacting the drying material in the first and second passages.

11. The air dryer of claim 1 further comprising a signal generator associated with the housing for generating a signal to an operator indicating that the differential pressure threshold has been exceeded.

12. A trailer braking system having a relay valve that receives a control signal from an operator at a control port to regulate an inlet/exhaust valve and selectively interconnect a supply port, delivery port, exhaust port to apply and release trailer wheel brakes, and an air dryer apparatus for the trailer braking system, said air dryer apparatus comprising:
   a housing having a first port adapted to communicate with supply pressure, a second port adapted to communicate with the operator, a third port adapted to communicate with the supply port of the relay valve, and a fourth port adapted to communicate with the control port of the relay valve, the first and third ports in communication via a first pasage having a drying material disposed therein, and the second and fourth ports in communication via a second passage having a drying material disposed therein.

13. The air dryer apparatus of claim 12 further comprising first and second bypass passages interconnecting the first and third ports, and interconnecting the second and fourth ports, respectively.

14. The air dryer apparatus of claim 12 wherein the first passage has a larger cross-section than the second passage to carry supply air for the trailer braking assembly.

15. The air dryer of claim 14 wherein the second passage carries the control air for the trailer braking assembly.

16. The air dryer of claim 12 further comprising a third passage for bypassing air around the first passage if a predetermined differential pressure threshold through the first passage is exceeded.

17. The air dryer of claim 16 wherein the third passage includes a valve responsive to the differential pressure through the first passage to regulate air through the third passage.

18. The air dryer of claim 12 further comprising a filter material provided in the first and second passages to clean the air passing therethrough.

19. The air dryer of claim 18 further comprising a biasing member for compacting the drying material in the first and second passages.

20. The air dryer of claim 12 further comprising a signal generator associated with the housing for generating a signal to an operator indicating that a differential pressure threshold has been exceeded.

* * * * *